United States Patent [19]

Plante

[11] Patent Number: 4,611,408

[45] Date of Patent: Sep. 16, 1986

[54] MECHANICAL AVERAGING GAUGE

[75] Inventor: Robert A. Plante, Erving, Mass.

[73] Assignee: The L. S. Starrett Company, Athol, Mass.

[21] Appl. No.: 783,579

[22] Filed: Oct. 3, 1985

[51] Int. Cl.[4] .............................................. G01B 5/20
[52] U.S. Cl. ......................................... 33/552; 33/557
[58] Field of Search ................. 33/530, 548, 552, 557, 33/560, DIG. 12; 269/267

[56] References Cited

U.S. PATENT DOCUMENTS

| | | | |
|---|---|---|---|
| 419,072 | 1/1890 | Richards | 269/267 |
| 1,256,217 | 2/1918 | Fieldhouse | 269/267 |
| 1,397,409 | 11/1921 | Duwelius | 269/267 |
| 2,076,829 | 4/1937 | Swartz | 269/267 |
| 2,722,867 | 11/1955 | Dackor et al. | 269/267 |
| 3,464,119 | 9/1969 | Griggs | 33/552 |
| 3,592,461 | 7/1971 | Lauriti | 269/267 |
| 3,959,886 | 6/1976 | Griggs | 33/174 C |
| 4,024,646 | 5/1977 | Griggs | 33/174 P |
| 4,063,449 | 12/1977 | Griggs | 73/37.5 |
| 4,222,172 | 9/1980 | Mason | 33/174 C |
| 4,322,887 | 4/1982 | Burton | 33/174 C |
| 4,374,459 | 2/1983 | Burton | 33/174 R |

OTHER PUBLICATIONS

A.S.M.E., "Device Holds Different Size Pieces for Milling" 12-1944, p. 3.

Primary Examiner—Richard R. Stearns
Attorney, Agent, or Firm—Kenway & Jenney

[57] ABSTRACT

A mechanical averaging gauge for averaging displacements at a plurality of locations along the surface of an object. The gauge includes a measuring unit which is urged into contact with the surface of the object. Several probes extend from the measuring unit and rest on the surface of the object. The probes are interconnected by means of cylindrical sliding members in contact with the rear of each of the probes. Trapezoidal sliding members are disposed between the cylindrical members so that the displacement of the measuring unit from a reference surface is the average of the various displacements of the individual probes. The arrangement also results in each probe contacting the surface of the object with substantially equal force. Therefore, the arrangement has application as a clamping device.

5 Claims, 5 Drawing Figures

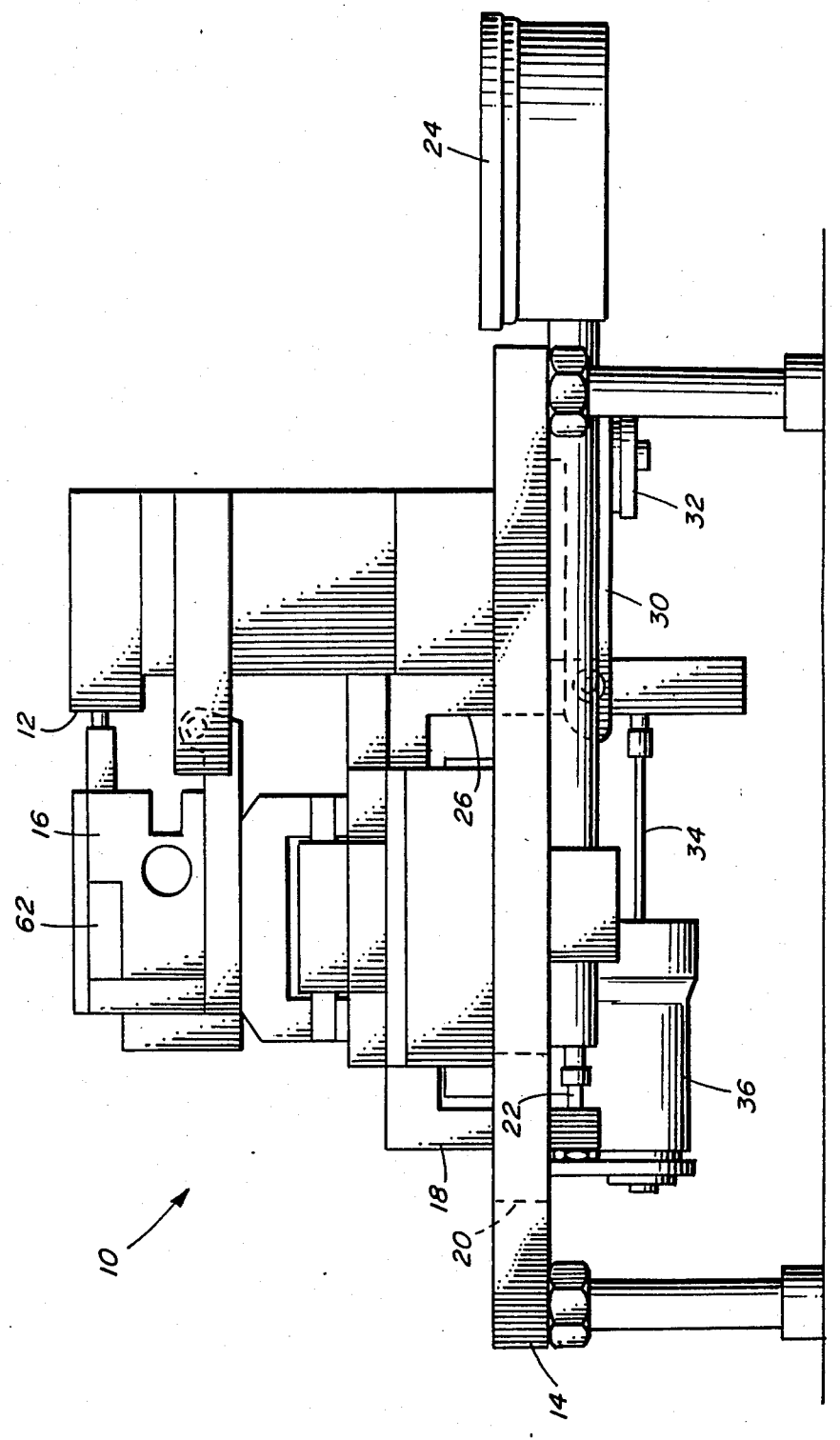

MECHANICAL AVERAGING GAUGE

BACKGROUND OF THE INVENTION

The present invention relates to a mechanical linkage which may be employed in a gauge to average displacements at a plurality of locations along the irregular surface of an object. The linkage arrangement also results in substantially equal force being applied to the object so that an equal force clamp may be constructed.

Gauges are known having probes for contacting irregular surfaces of an object with an output indicating the average of the individual probe displacements. Such gauges are often used for classifying vane airfoils so that turbine wheels can be built up having appropriate vane throat areas. One known gauge operates on a hydraulic principle to average probe displacements. Generally, flexible diaphragms with an unsupported section provide an interface between the probe and a fluid reservoir. The hydraulic gauges, while quite accurate, are temperature sensitive potentially resulting in errors with ambient temperature changes. Other classification gauges are known using "whiffles" or probes whose orientations are utilized for object classification.

It is therefore an object of the present invention to provide a gauge which eliminates the drawbacks of the known hydraulic gauges.

A further object of the invention is such a gauge which is highly accurate and substantially wear resistant resulting in a high degree of measurement repeatability.

A still further object of the invention is a mechanical linkage arrangement which provides equal force at each probe contact point for use in clamping.

SUMMARY OF THE INVENTION

The gauge apparatus of the present inveation for averaging displacements at a plurality of locations along the surface of an object from a reference surface includes a base member which supports the reference surface. A measuring unit is mounted on the base member for linear motion perpendicular to the reference surface and apparatus is provided for biasing the measuring unit toward the reference surface. Apparatus responsive to the displacement of the measuring unit from the reference surface is provided. The measuring unit of the present invention includes a plurality of probes extending from the measuring unit toward the reference surface and perpendicular to this surface. Contained within the measuring unit are a plurality of first and second sliding members, each of the first sliding members being in contact with a rear portion of one of the probes and the second sliding members being in contact with two adjacent ones of the first sliding members. By means of this linkage arrangement, the average of the displacements of the individual probes is equal to the amount of movement of the measuring unit and is indicated by a mechanical indicator or by electrical components.

The mechanical linkage within the measuring unit also results in each probe contacting the reference surface with essentially the same force. Thus, the mechanical linkage arrangement may be used as in a clamp which applies substantially equal force to an object at multiple locations along an irregular surface of the object.

BRIEF DESCRIPTION OF THE DRAWING

The invention disclosed herein will be understood better with reference to the drawing of which:

FIG. 2 is a side elevation view of the gauge;

DESCRIPTION OF THE PREFERRED EMBODIMENT

Figure 1:
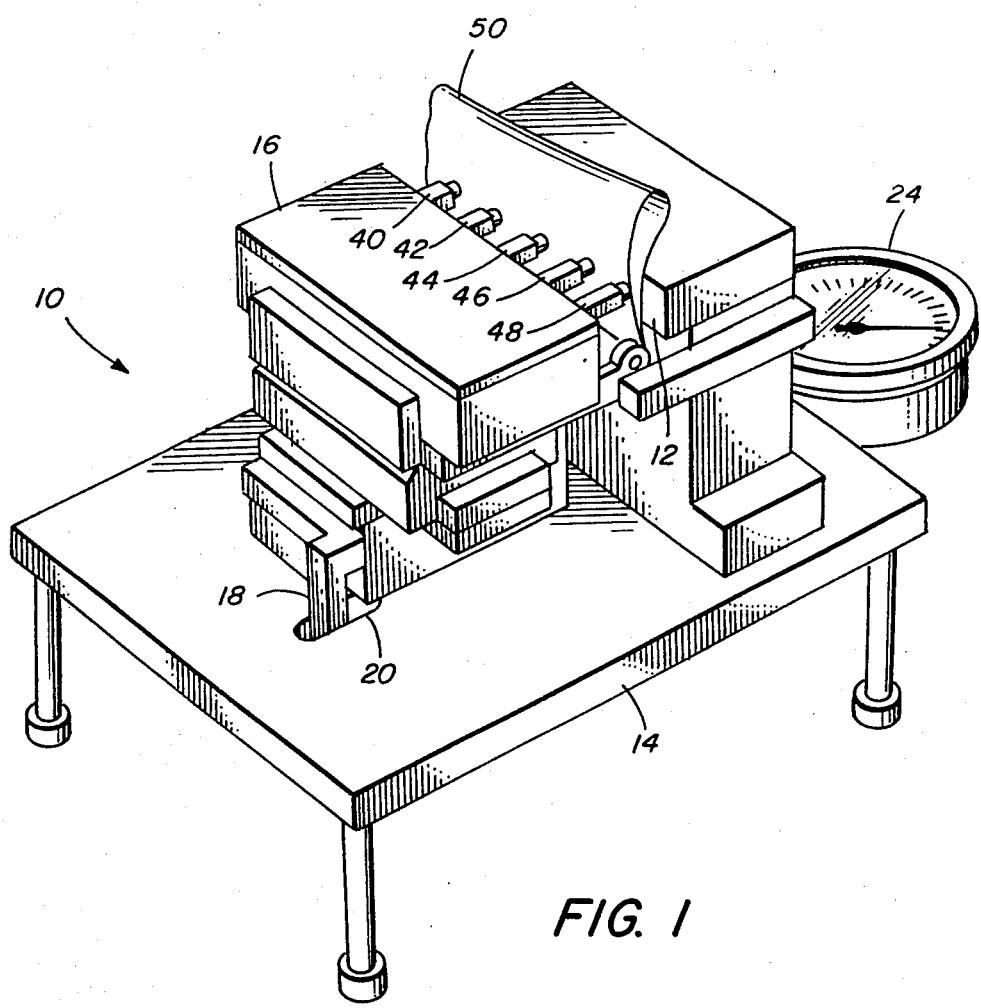
FIG. 1 is a perspective view of the gauge disclosed herein.
Figure 3:
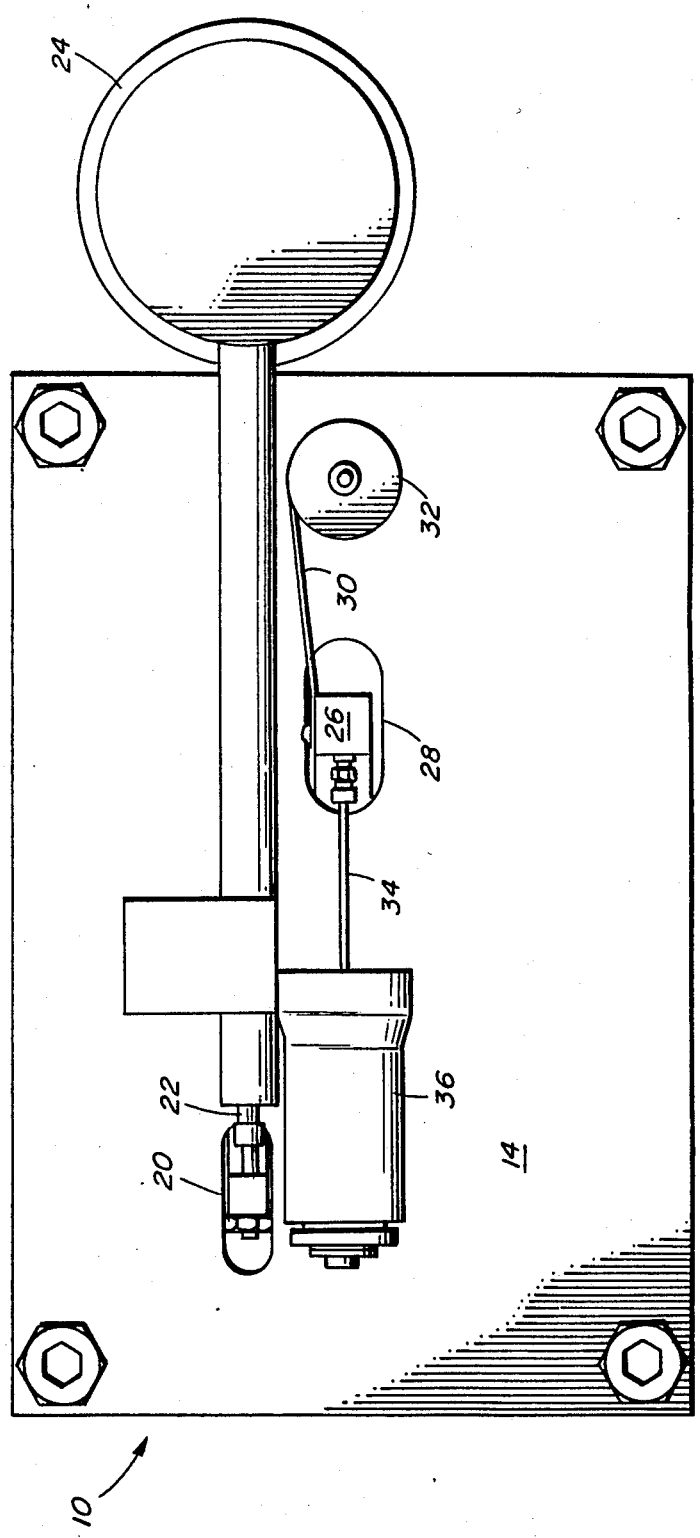
FIG. 3 is a bottom view of the gauge.

With reference first to FIGS. 1, 2 and 3, a gauge 10 has a reference surface 12 mounted on a base member 14. A measuring unit 16 is supported on the base member 14 for linear motion in a direction perpendicular to the surface 12. The measuring unit 16 is attached to an arm 18 which passes through a slot 20 and is connected to a shaft 22 which actuates an indicator 24. The indicator 24 thus responds to the position of the measuring unit 16 with respect to a reference such as the surface 12. Electronic measuring apparatus such as an LVDT may be used in place of the mechanical indicator 24 to provide a signal responsive to the position of the measuring unit 16 with respect to the reference surface 12. As can be seen in FIGS. 2 and 3, a second arm 26 attached to the measuring unit 16 passes through another slot 28 in the base member 14 and is attached to one end of spring material 30, the other end of which is wound around a spindle 32 creating a constant force spring mechanism which biases the measuring unit 16 toward the right in FIGS. 1, 2 and 3. Also connected to the arm 26 is a shaft 34 of a damper or dashpot 36. The damper 36 is rigidly affixed to the base member 14.

The measuring unit 16 will now be described in detail with reference to FIGS. 1 and 4. As shown in FIG. 1, the measuring unit 16 includes five probes 40, 42, 44, 46 and 48. It is emphasized that the use of five probes is entirely exemplary and more or fewer probes may be employed within the scope of the present invention. Still referring to FIG. 1, the probes 40–48 are shown in contact with a vane airfoil 50 whose characteristics are to be classified. It should be noted that the gauge 10 is particularly well suited for classifying vane airfoils such as the vane airfoil 50, but the gauge 10 has general application to performing measurements on other objects as well.

Figure 4:
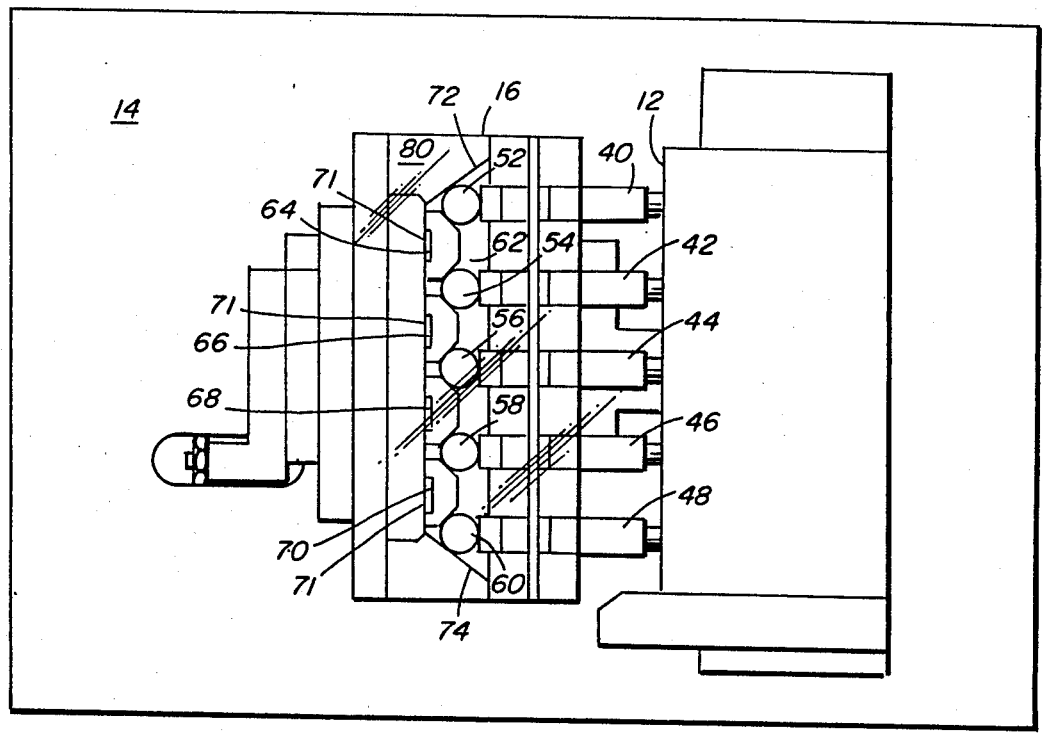
FIG. 4 is a view of the measuring or force applying member of the present invention.

As shown in FIG. 4, the probes 40–48 slide in channels in the measuring unit 16 with a rear portion of each of the probes coming into contact with right circular cylindrical members 52, 54, 56, 58 and 60. The cylindrical members 52–60 are slidable within a recess 62 (also see FIG. 2) in the unit 16. Trapezoidal members 64, 66, 68, and 70 are also slidable within the recess 62 and are arranged so that each one of the trapezoidal members 64 resides between an adjacent pair of the cylindrical members. That is, for example, the trapezoidal member 64 resides between the cylindrical members 52 and 54. The recess 62 includes angled sides 72 and 74. It is preferred that the probes, cylindrical and trapezoidal members all be made of a wear-resistant material such as hardened steel.

In order to understand fully the present invention, one must keep in mind that the cylindrical and trapezoidal members are freely slidable within the recess 62.

Each trapezoidal member 64–70 includes a recessed portion 71 to enhance sliding. If, for example, the probe 40 were pushed toward the left in FIG. 4, the cylindrical member 52 will be forced downwardly in FIG. 4 because of the sloping wall 72. The downward motion of the cylinder 52 biases the trapezoidal member 64 downwardly which, because of the sloping face 76 of the trapezoidal member 64, urges the cylindrical member 54 and the probe 42 to the right in FIG. 4. Similarly, the remaining probes 42–48 are also urged to the right in FIG. 4. The net effect of this unique linkage is that displacements of the individual probes 40–48 are averaged. In effect, the measuring unit 16 is a mechanical analog of the hydraulic gauges discussed above.

Figure 5:
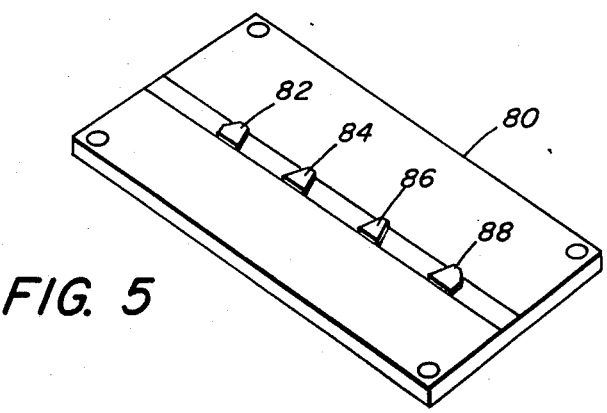
FIG. 5 is a perspective view of a top plate for covering the unit shown in FIG. 4.

FIG. 5 shows a top plate 80 which covers the top of the measuring unit 16. The top plate 80 includes raised portions 82, 84, 86 and 88 which maintain the cylindrical members disposed between adjacent pairs of trapezoidal members.

The operation of the present invention will now be discussed in conjunction with all of the figures. To perform measurements on a vane airfoil 50, for example the measuring unit 16 is moved toward the left in FIG. 1 and the vane airfoil 50 is inserted. When the measuring unit 16 is released, the constant force spring mechanism 32 pulls the measuring unit 16 toward the right bringing the probes 40–48 into contact with the surface of the vane airfoil 50. The dashpot 36 damps the motion of the measuring unit 16. Because of the linkage arrangement described above in conjunction with FIG. 4, each of the probes 40–48 will contact the surface of the vane airfoil 50 regardless of surface irregularities. When the measuring unit 16 comes to rest with the probes contacting the surface to be characterized, the position of the measuring unit is indicated by the indicator 24. Importantly, this indicated value is the average of the displacements of the individual probes 40–48 from a reference such as the reference surface 12.

Another important feature of the present invention is the recognition that the linkage arrangement described above not only averages the individual probes' displacement, but also, the force with which each of the probes contacts the surface is substantially equal. That is, once the measuring unit 16 comes to rest against the object to be measured due to the force of the constant force spring spindle mechanism, each of the probes pushes on the surface with substantially the same force; in this case, each probe pushes with one fifth of the force provided by the spindle mechanism 32. Thus, the apparatus 10 in FIG. 1 may also be considered a clamping device in that the object 50 is clamped between the probes and the reference surface 12 with each probe providing an equal force. Of course, for clamping, the spring mechanism might be replaced with other force applying devices such as a vise-like device. Such a clamp has numerous uses where it is important to apply forces uniformly over an irregular surface area.

The unique linkage arrangement of the present invention results in a gauge which is highly temperature insensitive and capable of highly repeatable measurements. Because the linkage elements are made of a wear-resistant material such as hardened steel, there is negligible wear, assuring repeatability. The present invention thus overcomes the drawbacks of known gauges by eliminating temperature sensitive hydraulic substances and deformable, stretchable diaphragms. The unique linkage also results in equal force application for use as a clamp.

It is recognized that modifications and variations will occur to those skilled in the art and it is intended that all such modifications and variations be included within the appended claims. For example, it is recognized that sliding members having shapes other than right circular cylindrical and trapezoidal may be used.

What is claimed is:

1. Gauge apparatus for averaging displacements at a plurality of locations along the surface of an object from a reference surface comprising:

a base member supporting the reference surface;

a measuring unit mounted on the base member for linear motion perpendicular to the reference surface and means for biasing the measuring unit toward the reference surface; and means arranged to indicate the displacement of the measuring unit from the reference surface;

the measuring unit comprising:

a plurality of probes extending from the measuring unit toward the reference surface and perpendicular to the reference surface;

the measuring unit including a plurality of first and second sliding members, each of the first sliding members being in contact with a rear portion of one of the probes and the second sliding members being in contact with two adjacent ones of the first sliding members.

2. The gauge of claim 1 wherein each of the plurality of first sliding members is a right circular cylinder and each of the plurality of second sliding members is substantially trapezoidal.

3. The gauge of claim 2 wherein the trapezoidal members have an apex angle of 37°.

4. The gauge of claim 1 wherein the means for biasing the measuring unit toward the reference surface comprises a constant force spring.

5. Gauge apparatus for averaging displacement at a plurality of locations along the surface of an object from a reference surface comprising:

a base member supporting the reference surface;

a measuring unit mounted on the base member for linear motion perpendicular to the reference surface and spring means for biasing the measuring unit toward the reference surface; and an indicator mounted on the base member and arranged to indicate the displacement of the measuring unit from the reference surface;

the measuring unit comprising:

a plurality of probes extending from the measuring unit toward the reference surface and perpendicular to the reference surface;

the measuring unit including a plurality of cylindrical sliding members each being in contact with a rear portion of one of the probes and further including a plurality of trapezoidal sliding members being in contact with two adjacent ones of the cylindrical sliding members;

whereby the indicator indicates the average of the displacements of each of the probes from the reference surface.

* * * * *